Dec. 19, 1967   H. J. TYLER ET AL   3,358,494
CALIBRATED CONTROL DEVICE AND METHOD
Filed Oct. 12, 1964   5 Sheets-Sheet 1

INVENTORS
HUGH J. TYLER
DENIS G. WOLFE
BY

*Caudor & Caudor*

THEIR ATTORNEYS

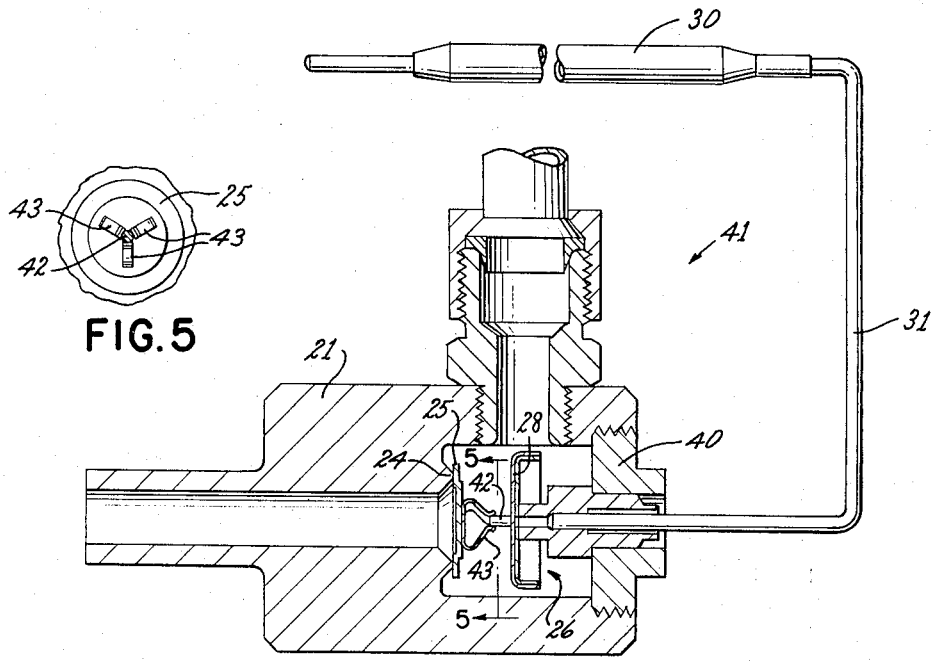
FIG. 5
FIG. 4
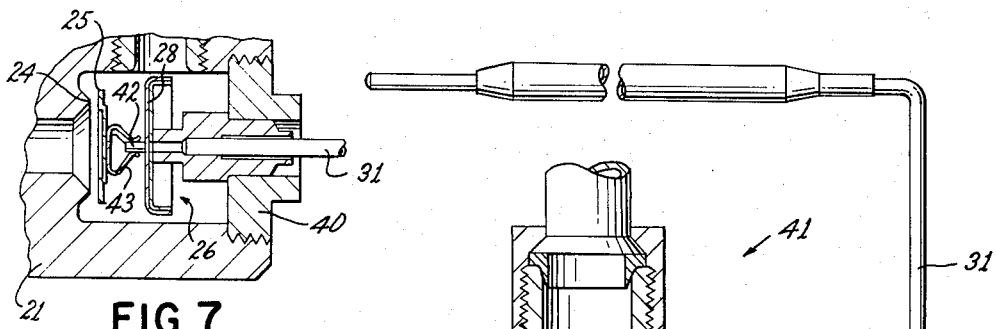
FIG. 7
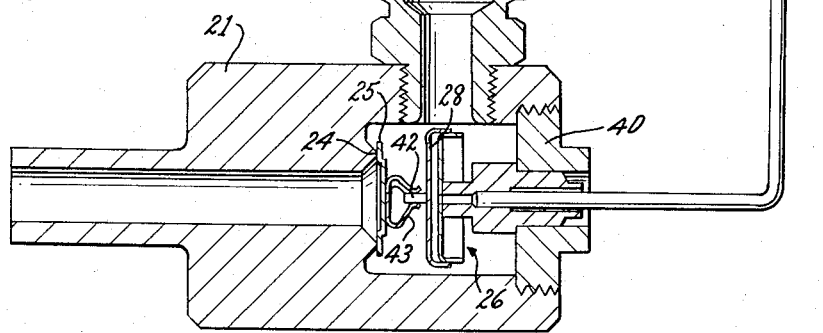
FIG. 6
INVENTORS
HUGH J. TYLER
DENIS G. WOLFE
BY
*Caudn & Caudn*
THEIR ATTORNEYS

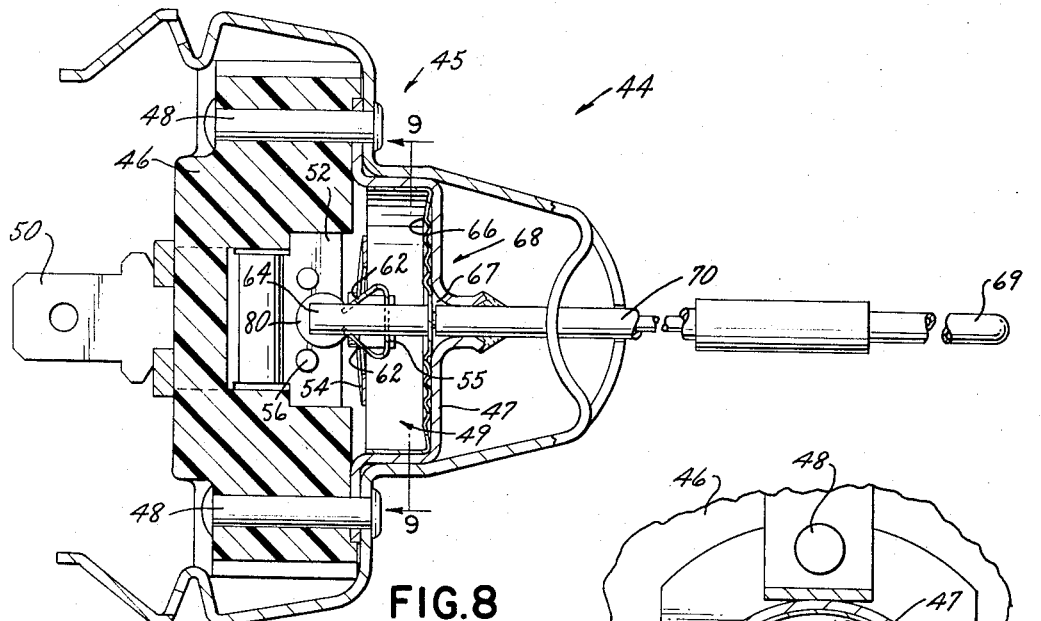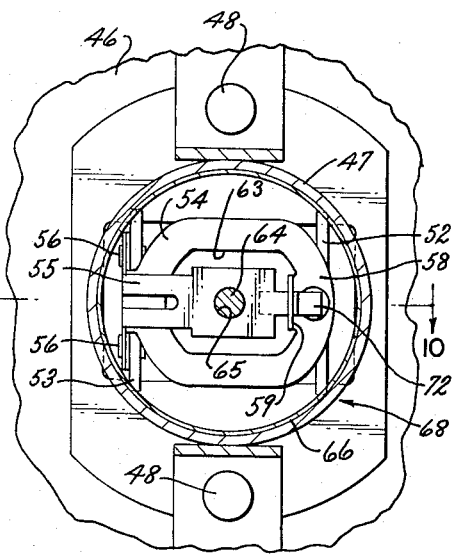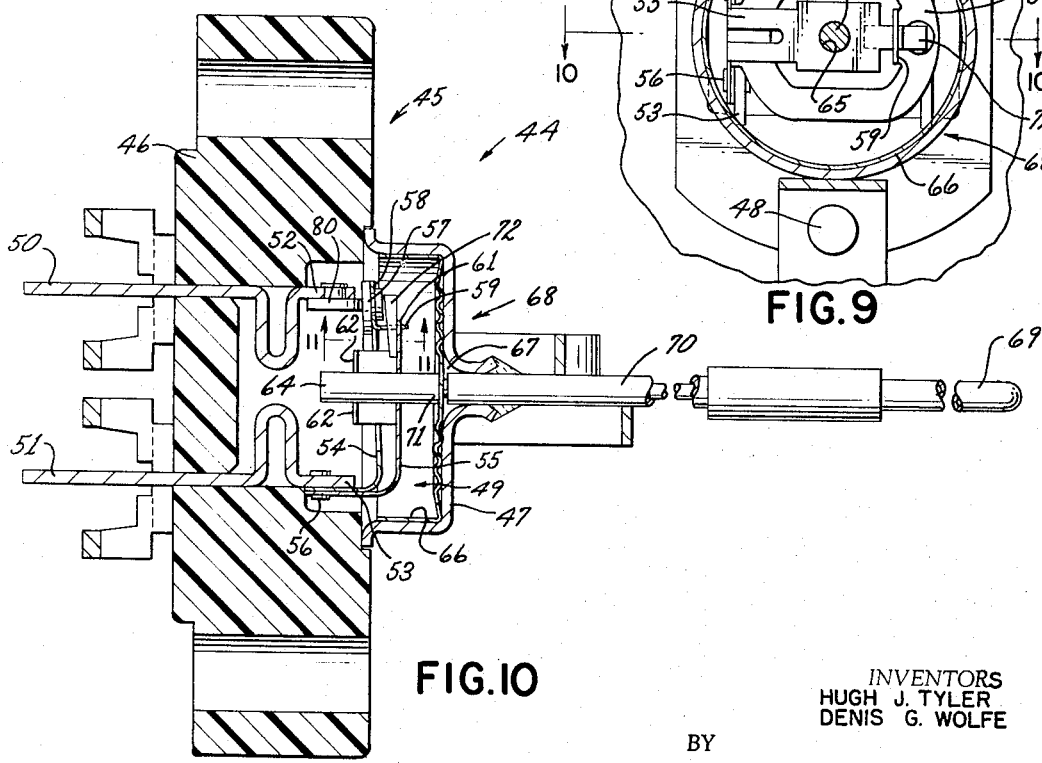

Dec. 19, 1967    H. J. TYLER ETAL    3,358,494
CALIBRATED CONTROL DEVICE AND METHOD
Filed Oct. 12, 1964    5 Sheets-Sheet 5

INVENTORS
HUGH J. TYLER
DENIS G. WOLFE
BY

THEIR ATTORNEYS

United States Patent Office 3,358,494
Patented Dec. 19, 1967

3,358,494
CALIBRATED CONTROL DEVICE AND METHOD
Hugh J. Tyler, Jeannette, and Denis G. Wolfe, Youngwood, Pa., assignors to Robertshaw Controls Company, Richmond, Va., a corporation of Delaware
Filed Oct. 12, 1964, Ser. No. 403,040
33 Claims. (Cl. 73—1)

ABSTRACT OF THE DISCLOSURE

A control device provided with internal means for setting the control to operate at a predetermined sensed condition. The condition responsive means and the control element are connected to an epoxy resin joint. The resin is allowed to harden while the sensor is subjected to a predetermined condition, thus obtaining the desired setting for the control.

---

This invention relates to an improved calibrated control device as well as to an improved method for calibrating such a device or the like.

In particular, this invention provides a control device or the like which has an operating element moved to a predetermined position when a condition responsive means of the control device senses a predetermined condition whereby the operating element will accurately cause an operating function of the device when such predetermined condition is sensed.

According to the teachings of this invention, such a control device has unique structure wherein the same can be readily and rapidly calibrated so as to function in the above manner.

Therefore, it is an object of this invetnion to provide an improved calibrated control device having one or more of the novel features set forth above or hereinafter shown or described.

Another object of this invention is to provide an improved method for calibrating such a device or the like.

Other objects, uses and advantages of this invention are apparent from a reading of this description which proceeds with reference to the accompanying drawings forming a part thereof and wherein:

FIGURE 4 is a view similar to FIGURE 1 and illustrates another control device of this invention.

FIGURE 5 is a fragmentary, cross-sectional view taken on line 5—5 of FIGURE 4.

FIGURE 6 is a view similar to FIGURE 4 and illustrates the control device in another operating position thereof.

FIGURE 7 is a fragmentary view similar to FIGURE 4 and illustrates the control device in still another operating position thereof.

FIGURE 8 is a cross-sectional view of another control device of this invention.

FIGURE 9 is a fragmentary, cross-sectional view taken on line 9—9 of FIGURE 8.

FIGURE 10 is a cross-sectional view taken substantially on line 10—10 of FIGURE 9.

Figure 1:
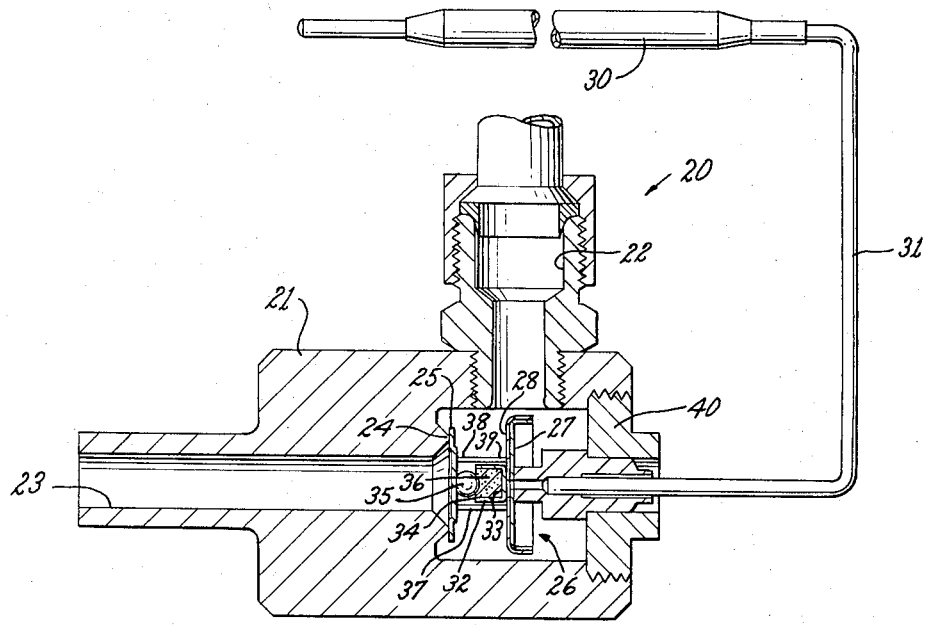
FIGURE 1 is a cross-sectional view illustrating one control device of this invention.

While the various features of this invention are hereinafter described and illustrated as being particularly adaptable for control devices responsive to temperature and the like, it is to be understood that the various features of this invention can be utilized singly or in any combination thereof with other types of control devices or the like.

Therefore, this invention is not to be limited to only the embodiments illustrated in the drawings, because the drawings are merely utilized to illustrate one of the wide variety of uses of this invention.

Referring now to FIGURE 1, an improved control device of this invention is generally indicated by the reference numeral 20 and comprises a housing means 21 having inlet passage means 22 and outlet passage means 23 interconnected together by a valve seat 24 adapted to be opened and closed by a valve member or operating element 25 in a manner hereinafter described.

The valve member 25 is adapted to be moved relative to the valve seat 24 by a condition responsive means 26 comprising a fixed wall 27 and a movable wall 28 cooperating together to define a chamber 29 therebetween which is interconnected to a temperature sensing bulb 30 by a conduit means 31.

Therefore, it can be seen that as the tmperature sensing bulb 30 senses a higher temperature, the fluid therein expands and causes the movable wall 28 of the condition responsive means 26 to move to the left away from the fixed wall 27 in the manner illustrated in FIGURE 2 to tend to close the valve member 25 in a manner hereinafter described. Conversely, when the temperature sensing bulb 30 senses a lower temperature, the fluid therein contracts and causes the movable wall 28 to move toward the fixed wall 27 of the condition responsive means 26 in a manner to tend to open the valve member 25 in the member hereinafter described.

In order to calibrate the control device 20 of this invention so the valve member 25 will seat against the valve seat 24 when a predetermined temperature is sensed by the temperature sensing bulb 30, improved means are provided for interconnecting the valve member 25 to the movable wall 28 of the condition responsive means 26 so that the same can be readily cal.brated to provide such function.

In particular, a cup-shaped retainer 32 or portion has the closed end 33 thereof secured to the movable wall 28 of the condition responsive means 26 whereby the open end 34 of the cup-shaped retainer 32 is adapted to telescopically receive a portion, such as a metal ball 35 or the like secured to the valve member 25 in the manner illustrated in FIGURE 1.

The cup-shaped retainer 32 is filled with an epoxy resin 36 or the like which can be subsequently set in any desired manner.

Before the resin 36 sets, the valve member 25 is interconnected to the movable wall 28 of the condition responsive means 26 by a flexible sleeve 37 having opposed ends 38 and 39 respectively secured to the valve member 25 and the movable wall 28 of the condition responsive means 26 to hold the same together in the manner illustrated in FIGURE 1.

If desired, the members 32, 35 and 37 can be so constructed and arranged that the flexible sleeve 37 fits tightly around the circumference of items 32 and 35.

Thereafter, the condition responsive means 26 together with the interconnecting valve member 25 is inserted in the housing means 21 by means of a threaded member 40 whereby the valve member 25 will be disposed against the valve seat 24 in the manner illustrated in FIGURE 1 or closely adjacent thereto.

Figure 2:
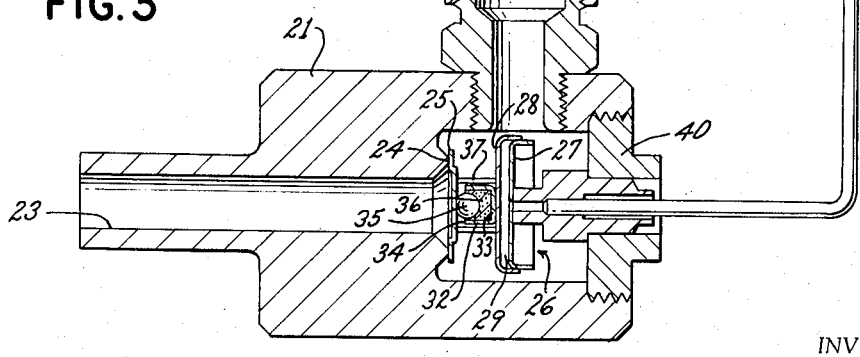
FIGURE 2 is a view similar to FIGURE 1 and illustrates the control device in another operating position thereof.

With the threaded member 40 now being fixed to the housing 21, the temperature sensing bulb 30 is disposed in a bath of fluid or the like being maintained at the desired predetermined temperature whereby the movable wall 28 of the condition responsive means 26 will move to the left in the manner illustrated in FIGURE 2 to further telescope the retainer 32 relative to the ball 35 whereby the ball 35 is received in the retainer 32 because the epoxy resin 36 has not been set. Since the temperature sensing means 30 is sensing a predetermined temperature which is required to close the valve member 25 against the valve seat 24, it can be seen that when the device 20 assumes the position illustrated in FIGURE 2, the epoxy resin 36 can be set in any desired manner, such as by a time set, thermal set or the like.

Figure 3:
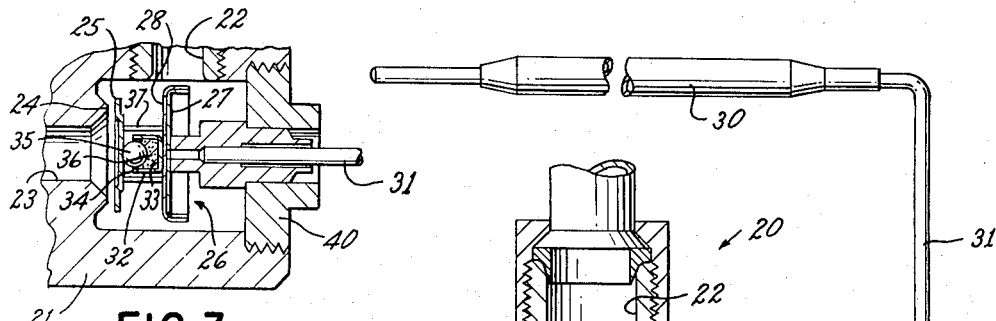
FIGURE 3 is a fragmentary view similar to FIGURE 1 and illustrates the control device in still another operating position thereof.

In any event, the valve member 25 is now fixed relative to the movable wall 28 of the condition responsive means 26 because of the set resin 36 whereby subsequent cooling of the temperature sensing bulb 30 will cause the movable wall 28 to move toward the fixed wall 27 in the manner illustrated in FIGURE 3 and move the valve member 25 away from the valve seat 24.

Thereafter, as the temperature sensing bulb 30 senses a temperature approaching the predetermined temperature, the valve member 25 is moved toward the valve seat 24 by the condition responsive means 26 whereby the condition responsive means 26 will seat the valve member 25 against the valve seat 24 when the bulb 30 senses the predetermined temperature.

Accordingly, it can be seen that the control device 20 has unique means interconnecting the valve member 25 to the condition responsive means 26 so that the valve member or operating element 25 will move against the valve seat or stop means 24 when the temperature sensing bulb 30 of the condition responsive means 26 senses a predetermined temperature.

Another control device of this invention is generally indicated by the reference numeral 41 in FIGURES 4–7 and parts of the control device 41 identical to the control device 20 are indicated by like reference numerals. However, instead of utilizing the ball 35 and cup-shaped retainer 32 of the device 20 to interconnect the valve member 25 to the movable wall 28 of the condition responsive means 26 in the manner of the control device 20, the control device 41 has a rod-like member 42 or portion interconnected to the movable wall 28 of the condition responsive means 26 and receivable between a plurality of resilient metal finger 43 or portion attached to the valve member 25 and forming a substantially tulip shape therewith.

In order to calibrate the device 41, the valve member 25 has the fingers 43 thereof telescoped onto the free end of the rod-like member 42 in the manner illustrated in FIGURE 4 whereby unset epoxy resin or the like (not shown for reasons of clarity) can be placed on the fingers 43 and the rod 42 for a purpose hereinafter described.

The condition responsive means 26 and the assembled valve member 25 are then threaded into the housing 21 by means of the threaded member 40 until the threaded member 40 is disposed in its fixed position relative to the housing means 21 whereby the valve member 25 will be disposed against the valve seat 24 or closely adjacent thereto.

The temperature sensing bulb 30 is then immersed in a bath of fluid held at the desired predetermined temperature whereby the movable wall 28 of the condition responsive means 26 will move to the left causing the rod-like member 42 to further telescope between the fingers 43 of the valve member 25 until the movable wall 28 has moved to the left the amount required by the sensing bulb 30.

Thereafter, the epoxy resin is set to permanently secure the finger 43 and rod-like member 42 together in the predetermined telescoped relation thereof so that subsequently should the temperature sensing bulb 30 sense the predetermined temperature, the condition responsive device 26 will cause the valve member 25 to seat against the valve seat 24 in the manner previously described, the condition responsive means 26 moving the valve member 25 away from the valve seat 24 when the temperature sensing bulb 30 senses a temperature below the predetermined temperature in the manner illustrated in FIGURE 7.

Accordingly, it can be seen that another means 42, 43 is provided for interconnecting an operating element 25 to a condition responsive means 26 whereby the condition responsive means 26 will dispose the operating element or the valve member 25 against the stop means or valve seat 24 when the temperature sensing bulb 30 senses a predetermined temperature because of the unique manner of initially calibrating such device in the above manner.

Another control device of this invention is generally indicated by the reference numeral 44 in FIGURES 8–13 and will now be described.

The control device 44 includes a housing means 45 formed of parts 46 and 47 suitably secured together by rivet-like means 48 to define a chamber 49 therebetween.

A pair of terminals 50 and 51 are carried by the housing part 46 and have ends 52 and 53 which respectively extend into the chamber 49, the end 52 of the terminal 50 carrying an electrical contact 80.

The end 53 of the terminal 51 carries a pair of flexible members 54 and 55 disposed against the end 53 in stacked relation and secured thereto by a rivet means 56 or the like.

The flexible member 54 carries an operating element or electrical contact 57 on the end 58 thereof which is adapted to be moved toward and away from the fixed contact 80 in a manner hereinafter described.

Figure 11:
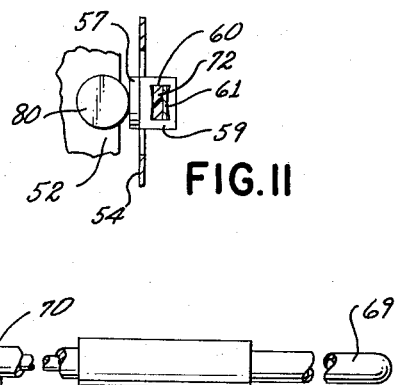
FIGURE 11 is a fragmentary, cross-sectional view taken on line 11—11 of FIGURE 10.

The flexible member 54 has an outwardly directed tang 59, FIGURES 10 and 11, provided with a slot 60 therein receiving the end 61 of the flexible member 55.

The flexible member 55 has a plurality of flexible fingers or portions 62 extending through a slot 63 in the flexible member 54. A rod-like member 64 or portion loosely projects through an opening 65 in the flexible member 55 and is telescopically received between the resilient fingers 62 of the flexible member 55 for a purpose hereinafter described.

A flexible cup-shaped metal member 66 is carried by the housing part 47 and cooperates therewith to define a chamber 67 therebetween, the flexible member 66 and housing part 47 forming a condition responsive means 68 and having the chamber 67 thereof interconnected to a temperature sensing bulb 69 by conduit means 70.

Before the housing parts 47 and 46 are secured together, the rod-like member 64 is telescoped between the fingers 62 of flexible member 55 in such a manner that the free end 71 of the rod-like member 64 will be adapted to abut the flexible member 66 when the same is assembled thereto and hold the movable contact 57 against the fixed contact 80 in a manner hereinafter described. A suitable adhesive means, such as an unset epoxy resin (not shown in the drawings for reason of clarity) is placed on the fingers 62 or the area around the hole 65, and rod-like member 64 to subsequently secure the same together in a predetermined telescoped relation thereof in a manner hereinafter described.

In addition, a wedge-like member 72 is disposed in the slot 60 of the tang 59 of the flexible member 54 to prevent any loss motion connection between the members 54 and 55 for a purpose hereinafter described, the wedge-like member 72 being formed of a material which can be subsequently vaporized by elevated temperatures without requiring removal of the housing part 47 from the housing part 46.

For example, the wedge-like member 72 can comprise a copolymer acetal resin sold under the trademark "Celcon" of the Celanese Corporation of America of New York, N.Y.

With the wedge-like member 72 in place and the rod-like member 64 telescoped in the fingers 62 of the flexible member 55, the housing part 47 is assembled to the housing part 46 by the fastening means 48 with the temperature sensing bulb 69 sensing a temperature below a predetermined temperature which is desired to have the contacts 80 and 57 contact with each other whereby the free end 71 of the rod-like member 64 will abut against the movable wall 66 of the condition responsive means 68 and cause the flexible member 55 to bend to the left and carry the flexible member 54 therewith until the contact 57 makes contact with the contact 80 whereby further assembly of the parts 47 and 46 together causes the rod-like member 64 to further telescope with the fingers 62 while holding the contact 57 in contact with the contact 80.

Figure 12:
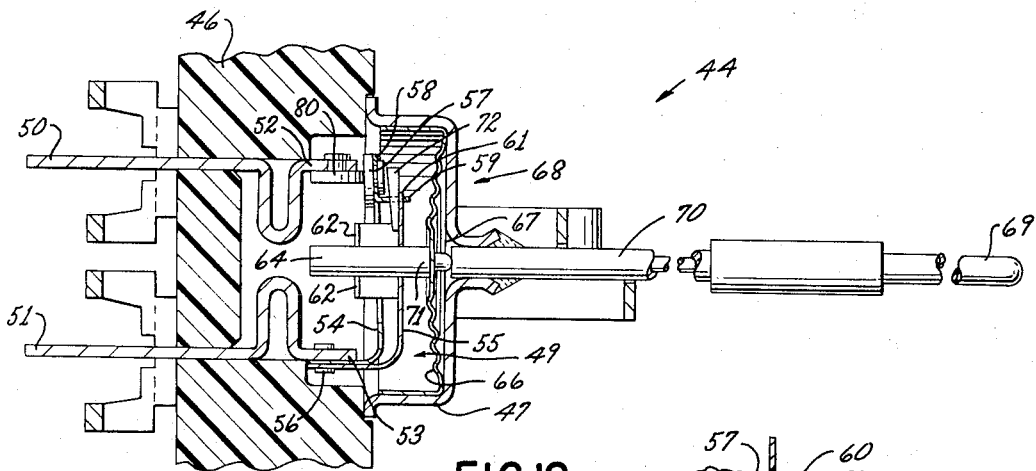
FIGURE 12 is a view similar to FIGURE 10 and illustrates the control device of FIGURE 10 in one of the operating positions thereof.

Thereafter, the temperature sensing bulb 69 is disposed in a bath of fluid or the like being maintained at a predetermined temperature whereby the movable wall 66 of the condition responsive means 68 will move to the left in the manner illustrated in FIGURE 12 and cause further telescoping of the rod-like member 64 relative to the finger 62 until the wall 66 has moved to the left to its final position as required by the temperature being sensed by the temperature sensing bulb 69.

Figure 13:
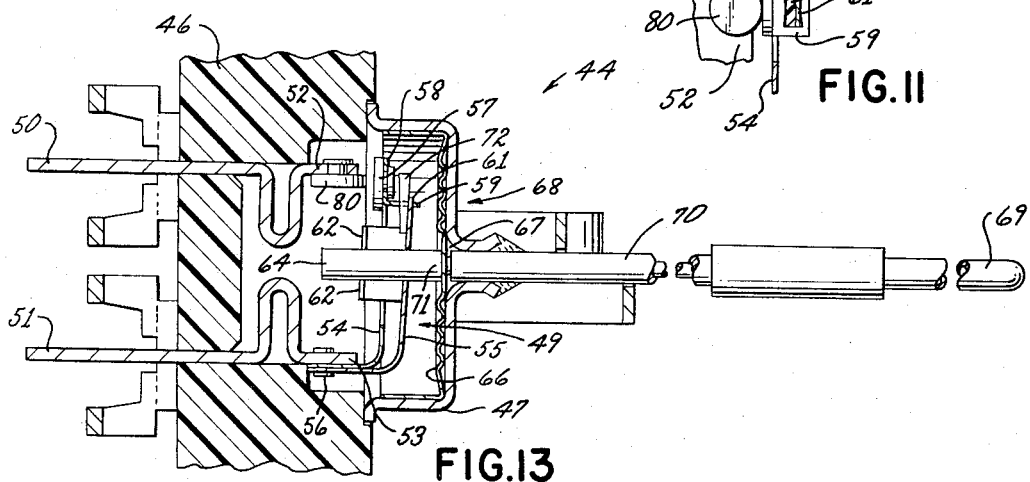
FIGURE 13 is a view similar to FIGURE 12 and illustrates the control device in another operating position thereof.
Figure 14:
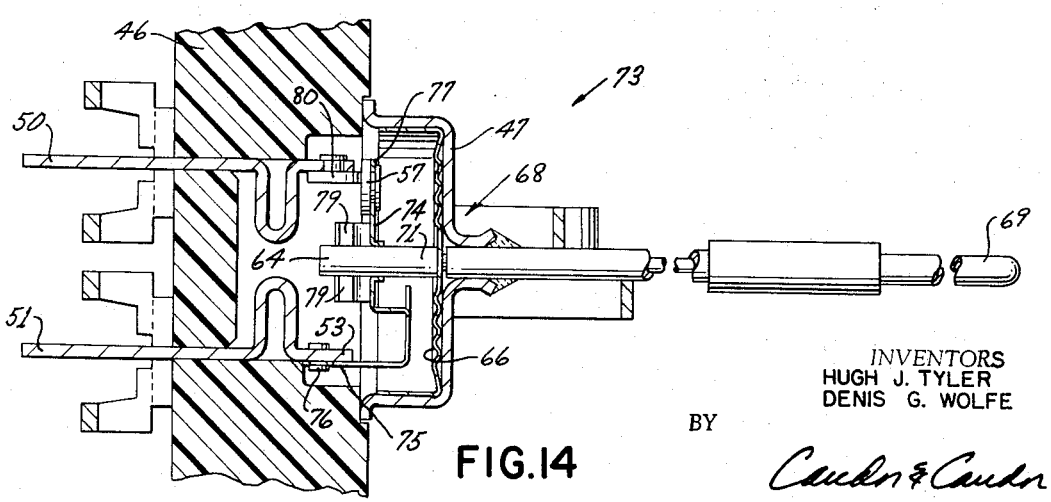
FIGURE 14 is a view similar to FIGURE 12 and illustrates another control device of this invention.

The bulb 69 is then removed from the controlled bath of fluid whereby the same begins to sense a temperature below the predetermined temperature whereby the flexibility or natural resiliency of the members 54 and 55 will cause the same to move to the right as the movable wall 66 moves to the right whereby the contact 57 will be moved out of contact with the contact 80 in the manner illustrated in FIGURE 13.

The unset epoxy resin on the rod-like member 64 and fingers 62 or the area around hole 65 will be subsequently set in such a manner to permanently fix the rod-like member 64 to the fingers 62 so that every time the temperature sensing bulb 69 senses the predetermined temperature, the contact 57 is moved into contact with the contact 80 to interconnect the terminals 50 and 51 together.

In order to remove the wedge-like member 72 from the assembled control device 44 without removing the housing part 47 and, thus, destroying the previously described calibration thereof, the control device 44 is heated to approximately 500° F. in such a manner that the wedge-like member 72 merely vaporizes and, thus, frees the end 61 of the flexible member 55 in the slot 60 of the tang 59 of the flexible member 54, such vaporizing temperature also being utilized to set the epoxy resin on the rod-like member 64 and fingers 62, if desired.

With the wedge-like member 72 vaporized in the above manner, the control device 44 is now adapted to operate in the following manner without requiring recalibration thereof.

In particular, when the temperature sensing bulb 69 senses the predetermined temperature, the wall 66 of the condition responsive means 68 has moved to the left to such an extent, that it has caused the rod 64, now fixed to the fingers 62 of the flexible member 55, to flex the member 55 and carry the flexible member 54 therewith so that the contact 57 will make electrical contact with the contact 80 and interconnect the terminals 50 and 51 together. Such flexing movement of the flexible member 54 is because the member 54 is biased against the flexible member 55, and, since member 55 is heavier than member 54, flexing movement of member 55 controls the flexing movement of member 54. However, should the temperature sensing bulb 69 sense a higher temperature, the flexible member 55 is adapted to flex relative to the member 54 because the end 61 of the flexible member 55 is adapted to move in the slot 60 so that an overshooting of the control device 44 can take place without adversely affecting the calibration thereof.

Another control device of this invention is generally indicated by the reference numeral 73 in FIGURES 14–17 and parts thereof similar to the control device 44 will be indicated by like reference numerals.

However, in place of the flexible members 54 and 55 of the control device 54, the control device 73 has a single flexible member 74 provided with an end 75 fastened to the end 53 of the terminal 51 by rivet means 76.

The other end 77 of the flexible member 74 carries the contact or operating element 57 which is cooperable with the fixed contact 80 on the terminal 50 in a manner hereinafter described.

The flexible member 74 receives the rod-like member 64 or portion in a bore 78 thereof and between a plurality of flexible fingers 79 or portion thereof, the rod-like member 64 having its end 71 disposed against the movable wall 66 of the condition responsive means 68.

When it is desired to calibrate the device 73, the rod-like member 64 is telescoped in the fingers 79 of the flexible members 74 in such a manner that the same will cause the contact 57 to be disposed in electrical contact with the contact 80 when the housing part 47 is assembled to the housing part 46 with the temperature sensing bulb 69 sensing a temperature below the desired predetermined temperature, a suitable epoxy resin or the like being disposed on the rod-like member 64 and fingers 79 or the area around hole 78 to be set in a manner hereinafter described.

Figure 15:
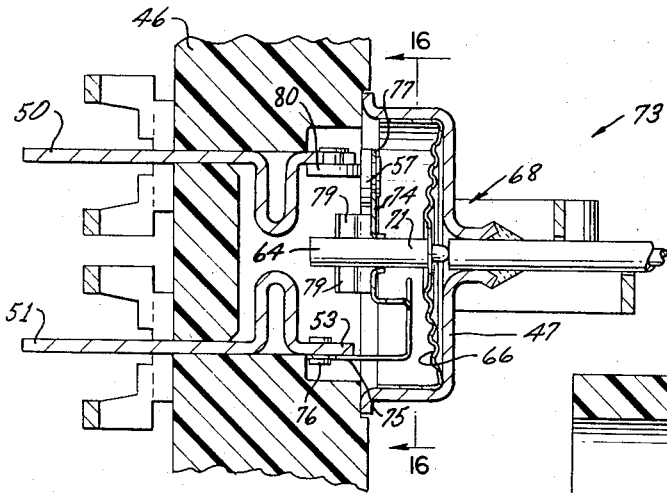
FIGURE 15 is a view similar to FIGURE 14 and illustrates the control device in another operating position thereof.

With the device 73 assembled in the above manner, the temperature sensing bulb 69 is disposed in a bath of fluid controlled at the desired predetermined temperature whereby the movable wall 66 will expand outwardly to the left in an amount proportional to the temperature sensed by the temperature sensing bulb 69 to further telescope the rod-like member 64 with the fingers 79 in the manner illustrated in FIGURE 15.

Figure 17:
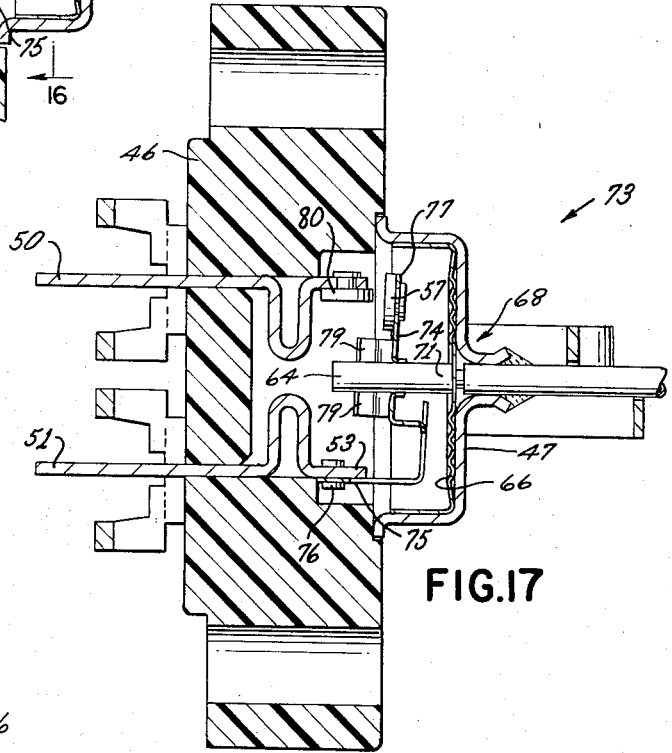
FIGURE 17 is a view similar to FIGURE 15 and illustrates the control device in another operating position thereof.
Figure 16:
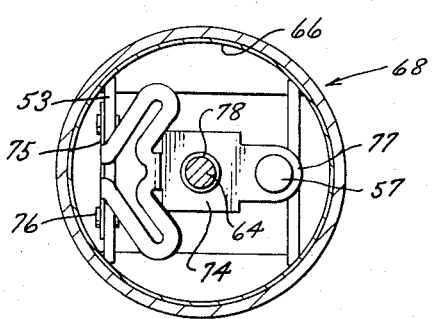
FIGURE 16 is a fragmentary, cross-sectional view taken on line 16—16 of FIGURE 15.

Thereafter, the epoxy resin is set to permanently secure the rod-like member 64 and fingers 79 or the area around hole 78 together so that each time the bulb 69 senses the predetermined temperature, the movable contact 57 will be move into electrical contact with the fixed contact 80 in the manner illustrated in FIGURE 15, the flexible member 74 moving to the right when the temperature sensing bulb 69 senses a lower temperature in the manner illustrated in FIGURE 17 to break the electrical contact between the contacts 57 and 80.

Accordingly, it can be seen that not only does this invention provide improved control devices wherein the same move an operating element to a predetermined position every time the device senses a predetermined condition, but also this invention provides improved means for simply and rapidly calibrating such devices or the like.

While the form of the invention now preferred has been disclosed as required by the statutes, other forms may be used, all coming within the scope of the claims which follow.

What is claimed is:

1. In combination, a housing means having stop means, a condition responsive means carried by said housing means and controlling movement of a movable portion, an operating element having a portion disposed adjacent said movable portion for initial relative positioning movement between said portions, and adhesive means for securing said portion of said operating element to said movable portion after said condition responsive means has sensed a predetermined condition and has moved said movable portion to a particular position relative to said portion of said operating element while said operating element is disposed against said stop means so that said operating element will thereafter always be disposed against said stop means when said movable portion is moved to a predetermined position by said condition responsive means sensing said predetermined condition.

2. A combination as set forth in claim 1 wherein said stop means is a valve seat and said operating element is a valve member.

3. A combination as set forth in claim 1 wherein said stop means is a fixed electrical contact and said operating element is a movable contact.

4. In combination, a housing means having stop means, a condition responsive means carried by said housing means and controlling movement of a movable portion, an operating element having a portion, said portion of said operating element and said movable portion being disposed in telescoping relation for initial relative positioning movement between said portions, and adhesive means for securing said telescoping portions together after said condition responsive means has sensed a predetermined condition and has moved said movable portion to a particular position relative to said portion of said operating element while said operating element is disposed against said stop means so that said operating element will thereafter always be disposed against said stop means when said movable portion is moved to a predetermined position by said condition responsive means sensing said predetermined condition.

5. A combination as set forth in claim 4 wherein said adhesive means comprises an epoxy resin.

6. In combination, a housing means having stop means, a condition responsive means carried by said housing means and controlling movement of a movable rod-like member, an operating element having a plurality of flexible fingers receiving said rod-like member therebetween, and adhesive means securing said fingers and said rod-like member together so that said operating element will be disposed against said stop means when said rod-like member is moved to a predetermined position by said condition responsive means.

7. A combination as set forth in claim 6 wherein said flexible fingers extend toward said condition responsive means.

8. A combination as set forth in claim 6 wherein said flexible fingers extend away from said condition responsive means.

9. A combination as set forth in claim 6 wherein said rod-like member is attached to said condition responsive means.

10. A combination as set forth in claim 6 wherein said rod-like member is separated from said condition responsive means.

11. In combination, a housing means having stop means, a condition responsive means carried by said housing means and controlling movement of a movable tubular portion, an operating element having a ball fixed thereto and being telescoped into said tubular portion, and adhesive means disposed in said tubular portion for securing said ball and tubular portion together so that said operating element will be disposed against said stop means when said tubular portion is moved to a predetermined position by said condition responsive means.

12. A combination as set forth in claim 11 wherein resilient means holds said operating element to said condition responsive means before said adhesive means sets.

13. A combination as set forth in claim 12 wherein said resilient means comprises a sleeve surrounding said tubular portion and said ball.

14. In combination, a housing means having stop means, a condition responsive means carried by said housing means and having a movable wall, a first flexible member carrying an operating element, a second flexible member controlling movement of said first flexible member and having a plurality of flexible fingers, a rod-like member engageable with said movable wall and received between said fingers, and adhesive means securing said rod-like member to said second flexible member so that said operating element will be disposed against said stop means when said movable wall is moved to a predetermined position by said condition responsive means.

15. A combination as set forth in claim 14 wherein said second flexible member has a lost motion connection with said first flexible member.

16. A method for calibrating a device having a stop means and a condition responsive means, said method comprising the steps of sensing a predetermined condition with said condition responsive means to cause said condition responsive means to move a movable portion to a predetermined position adjacent a portion of an operating element disposed against said stop means, and, thereafter, securing said movable portion and said portion of said operating element together while said portions are in said predetermined position so that said operating element will thereafter always be disposed against said stop means when said movable portion is moved to said predetermined position by said condition responsive means.

17. A method as set forth in claim 16 and including the steps of forming said stop means as a valve seat and forming said operating element as a valve member.

18. A method as set forth in claim 16 and including the steps of forming said stop means as a fixed electrical contact and forming said operating element as a movable contact.

19. A method for calibrating a device having a stop means and a condition responsive means, said method comprising the steps of telescoping a movable portion of said condition responsive means with a portion of an operating element, sensing a predetermined condition with said condition responsive means to cause said condition responsive means to telescope said portions to a predetermined position with said operating element disposed against said stop means, and, thereafter, securing said portions together with adhesive means while said portions are in said predetermined position so that said operating element will thereafter always be disposed against said stop means when said condition responsive means senses said predetermined condition.

20. A method as set forth in claim 19 wherein said securing step includes the step of utilizing an epoxy resin.

21. A method for calibrating a device having a stop means and a condition responsive means, said method comprising the steps of providing an operating element having a plurality of flexible fingers, telescoping a rod-like member of said condition responsive means between said fingers of said operating element, sensing a predetermined condition with said condition responsive means to further telescope said rod-like member between said fingers with said operating element disposed against said stop means, and, thereafter, securing said fingers and said rod-like member together with adhesive means so that said operating element will be disposed against said stop means when said condition responsive means senses said predetermined condition.

22. A method as set forth in claim 21 wherein said telescoping step includes the step of extending said fingers toward said condition responsive means.

23. A method as set forth in claim 21 wherein said telescoping step includes the step of extending said fingers away from said condition responsive means.

24. A method as set forth in claim 21 and including the step of securing said rod-like member to said condition responsive means.

25. A method as set forth in claim 21 and including the step of forming said rod-like member separate from said condition responsive means.

26. A method for calibrating a device having a stop means and a condition responsive means, said method comprising the steps of providing an operating element having a ball thereon, disposing adhesive means in a movable tubular portion whose movement is controlled by said condition responsive means, telescoping said ball into said tubular portion, and sensing a predetermined condition with said condition responsive means to further telescope said ball into said tubular portion with said operating element disposed against said stop means whereby said adhesive means secures said telescoped ball and tubular portion together so that said operating element will be disposed against said stop means when said condition responsive means senses said predetermined condition.

27. A method as set forth in claim 26 and including the step of holding said operating element to said condition responsive means with resilient means before said adhesive means sets.

28. A method as set forth in claim 27 of forming said resilient means from a sleeve that surrounds said tubular portion and said ball.

29. A method for calibrating a device having a stop means and a condition responsive means, said method comprising the steps of providing a first flexible member carrying an operating element, providing a second flexible member to control movement of said first flexible member, telescoping a rod-like member in fingers of said second flexible member, sensing a predetermined condition with said condition responsive means to further telescope said rod-like member and said fingers with said operating element being disposed against said stop means, and securing said rod-like member and said second flexible member together so that operating element will be disposed against said stop means when said condition responsive means senses said predetermined condition.

30. A method as set forth in claim 29 and including the step of providing a lost motion connection between said flexible members to provide overshoot means for said condition responsive means.

31. A method as set forth in claim 30 and including the step of preventing said lost motion to occur during said sensing step.

32. A method as set forth in claim 31 wherein said last-named step includes the step of inserting a stop member between said flexible members.

33. A method as set forth in claim 32 and including the step of vaporizing said stop member after said securing step.

References Cited

UNITED STATES PATENTS

| | | | |
|---|---|---|---|
| 2,460,762 | 2/1949 | Minnich | 200—140 |
| 2,636,776 | 4/1953 | Vernet | 73—1 |
| 3,148,258 | 9/1964 | Dales | 200—138.6 |
| 3,160,950 | 12/1964 | O'Sullivan et al. | 29—423 |
| 3,230,071 | 1/1966 | Gelzer | 73—1 |

LOUIS R. PRINCE, *Primary Examiner.*

S. CLEMENT SWISHER, *Assistant Examiner.*